United States Patent [19]

Castellucci et al.

[11] Patent Number: 5,621,062

[45] Date of Patent: Apr. 15, 1997

[54] AMBIENT RAPID-CURING AMINO AND EPOXIDE POLYTHIOETHER REACTANTS COMPOSITIONS

[75] Inventors: Nicholas T. Castellucci, Lomita; Roger M. Heitz, Palos Verdes Estates, both of Calif.

[73] Assignee: Northrop Grumman Corporation, Los Angeles, Calif.

[21] Appl. No.: 552,031

[22] Filed: Nov. 2, 1995

[51] Int. Cl.$^6$ .................................................. C08G 75/04
[52] U.S. Cl. ............................ 528/30; 528/374; 528/375
[58] Field of Search ............................... 528/30, 374, 375

[56] References Cited

U.S. PATENT DOCUMENTS

| | | | |
|---|---|---|---|
| 4,151,157 | 4/1979 | Williams et al. | 528/30 |
| 4,336,307 | 6/1982 | Singh et al. | 528/373 |
| 4,950,707 | 8/1990 | Shimizu et al. | 528/30 |
| 5,429,772 | 7/1995 | Castellucci et al. | 428/402 |

*Primary Examiner*—Robert E. Sellers
*Attorney, Agent, or Firm*—Terry J. Anderson; Karl J. Hoch, Jr.

[57] ABSTRACT

Solvent-free, fluid polythioether coating or caulking compositions having excellent room-temperature self-curing properties and excellent leveling properties are produced by mixing reactive liquid precursor components comprising a hydroxyl- or silyl-terminated amino polythioether of formula A and a hydroxyl- or silyl-terminated epoxy polythioether of formula B. The mixture is applied to a surface to the protected, preferably a hydrolyzable metal surface such as aluminum which is reactive with the hydroxyl or silyl terminal groups, and cured at room temperature for less than two hours to produce a self-leveling protective coating or gap-fill which is strongly-bonded to the surface and is flexible and stable over a wide temperature range between about −60° F. and +360° F.

7 Claims, No Drawings

AMBIENT RAPID-CURING AMINO AND EPOXIDE POLYTHIOETHER REACTANTS COMPOSITIONS

BACKGROUND OF THE INVENTION

1. Field of the Invention

The present invention relates to novel curable polythioether compositions which include reactive liquid polythioether components which react with each other rapidly and at room temperature to form an elastomer having terminal groups which chemically bond to metallic surfaces such as aluminum alloy and aluminum composite surfaces, and/or to epoxy primer coatings applied to such surfaces. Such compositions are well suited for use as protective coatings or in caulks for filling gaps, cracks or other narrow spaces in metallic, polymeric, composite and/or epoxy, polyurethane, or acrylic-primed surfaces since they are light in weight, they bond to such surfaces during rapid curing at room temperatures, they provide improved filler properties over a wide range of temperatures, and they form smooth rubbery deposits having excellent water resistance and corrosion resistance, expansion-and-contraction properties and resistance to cracking.

2. Discussion of the Known Art

Reference is made to commonly-owned U.S. Pat. No. 5,206,285 relating to water-base coating compositions containing a hydrolyzable silane polymer precursor formed by reacting an epoxy trialkoxy silane with a primary amino trialkoxy silane for 24 hours at room temperature. The precursor solution is hydrolyzed and cured in situ, such as on an aluminum surface, to react the terminal silanol sites of the polymer with the aluminum surface during curing to form a strongly bonded coating or filler.

Reference is also made to U.S. Pat. Nos. 4,366,307 and 4,960,844 which disclose polythioether coating and caulking compositions in which the polythioether is a liquid polymer which is curable at room temperature to form an elastomer having terminal vulcanizable or reactive groups such as silyl, hydroxy, alkoxy, mercapto and/or other reactive groups. The compositions of the Patent can contain amounts of filler, such as carbon-black, and are disclosed for use as water-, solvent-, fuel- and temperature-resistant sealants.

Reference is also made to U.S. Pat. No. 4,786,667 which discloses curable liquid polyether polymers having hydrolyzable silyl end groups, formed by reacting epoxy-substituted hydrolyzable silane monomers, diepoxy polyoxyalkylenes and aromatic diamines. The polymers of the Patent require the use of a curing catalyst such as an organo tin compound.

Various other polythioether liquid polymers are known which are curable by heating for 24 hours or more at room temperatures to form rubbery solids which can contain fillers as colorants, conductivity particles, etc. While such compositions display better adhesive properties for metallic surfaces and better resistance to cracking than other coating, gap-filling or caulking compositions, such as those based upon polyurethanes, silicone sealing polymers or other conventional binder materials used in coating, caulking and gap-filling compositions, they present problems with respect to their relatively slow curing properties and/or their requirement for the inclusion of curing catalysts. Also they are not reactive with metallic surfaces for chemical-bonding thereto.

SUMMARY OF THE INVENTION

The present invention relates to the discovery that solvent-free, fluid polythioether coating or caulking compositions having excellent room-temperature curing properties and excellent levelling properties can be produced by mixing reactive liquid precursor components comprising a hydroxyl- or silyl-terminated amino polythioether of formula A and a hydroxyl- or silyl-terminated epoxy polythioether of formula B, promptly applying the mixture to a surface to be protected, preferably a hydrolyzable metal surface such as aluminum which is reactive with the hydroxyl or silyl terminal groups, and curing at room temperature for less than two hours to produce a protective coating or gap-fill which is strongly-bonded to the surface and is flexible and stable over a wide temperature range between about −60° F. and +360° F. The leveling properties of the present liquid precursor compositions permit them to flow and level in a gap or as a surface layer before the composition cures and solidifies within two hours at room temperature.

DETAILED DESCRIPTION

The present compositions comprise a mixture of co-reactive liquid polythioether amino and epoxy precursors having hydroxyl or silyl terminal groups, and which is curable in two hours or less at room temperature to form a rubbery solid elastomeric coating or gap-fill which is flexible and stable over a temperature range between about −60° F. and +350° F.

The present co-reactive polythioether polymer precursors A and B comprise the following common basic structure:

$$R-CH_2-X-CH_2 \left[ -S-CH_2-\underset{R^1}{\underset{|}{\overset{H}{\overset{|}{C}}}}- \right]_n S-CH_2-XCH_2-R$$

in which R is a radical selected from the group consisting of —OH, —OSi(OR$^2$)$^3$ and —Si(OR$^2$)$_3$, R$^2$ is an alkyl radical having 1–4 carbon atoms, n is a whole number between 2 and 20, R$^1$ is —R$^3$—Z in which R$^3$ is phenylene, phenylene ether, alkylene or alkylene ether, Z is —(NH$_2$)y or

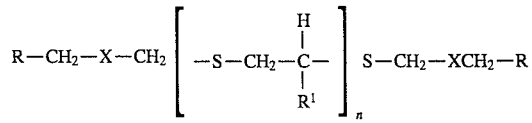

y is 1 to 3 and X is —O— or —CH$_2$—.

The formula A amino polyioether co-reactive precursor has the above basic structure in which each R$^1$ is a radical —R$^3$—(NH$_2$)y in which R$^3$ is phenylene, phenylene ether, alkylene or alkylene ether and y=1–3.

The formula B epoxy polythioether co-reactive precursor has the above basic structure in which each R$^1$ is a radical

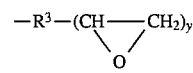

in which R$^3$ and y are as defined above.

Since the co-reactive precursors each have two reactive R$^1$ cross-linking groups, the precursors A and B preferably are present in about equimolar or stoichiometric amounts to permit completion of the curing reaction and stability of the cured polymer.

Preferred formula A co-reactants are the amino-silyl polythioethers having the formula:

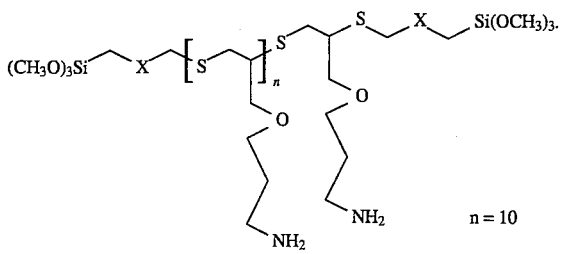

Preferred formula B co-reactants are the epoxy-silyl polythioethers having the formula:

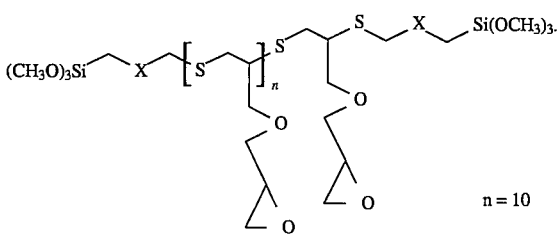

The present amino-epoxy reaction is well-known to those skilled in the art. However, the present invention is based upon the positions at which the reactive amino and epoxy groups are attached to the precursor backbones to produce the desired degree of reactivity with each other which results in rapid room temperature curing without the need for any catalyst.

The novel compositions of the present invention include low viscosity flowable coating compositions such as protective and decorative surface layers or paints, bonding or adhesive layers, sealant layers, etc., and higher viscosity, thick, syrupy gap-fill or caulking compositions. Preferably the present compositions are free of volatile organic solvents and diluents, particularly volatile organic vehicles and halogenated vehicles, and their desired viscosity is obtained by controlling the molecular weight of the precursors A and B within the range of from about 1000 to 5000 cp, for less viscous, more flowably precursors having the consistency of olive oil, up to about 10,000 to 20,000 centipoise, for more viscous, thicker precursors having the consistency of a thick syrup.

The viscosity can also be increased by the addition of pigments and/or fillers, for example, up to about 50% by weight in the case of caulking or gap-fill compositions to render them semi-solid, opaque such as white or other desired color, electro-conductive or to impart other desirable properties such as levelling properties.

Generally, the amino precursor compound A and the epoxy precursor compound B are used in equimolar amounts in cases where they contain an equal number of reactive amine and epoxide groups, to produce a stable, inert coating or gap-fill. However, the molar ratio of compounds A and B may be varied between about 1:3 and 3:1, particularly in cases where the minor ingredient contains a larger number of reactive amino or epoxy groups than does the major ingredient. The number of reactive groups in precursors A and B is proportional to the molecular weight thereof.

The present aminopolythioether precursors A may be produced by the following reaction:

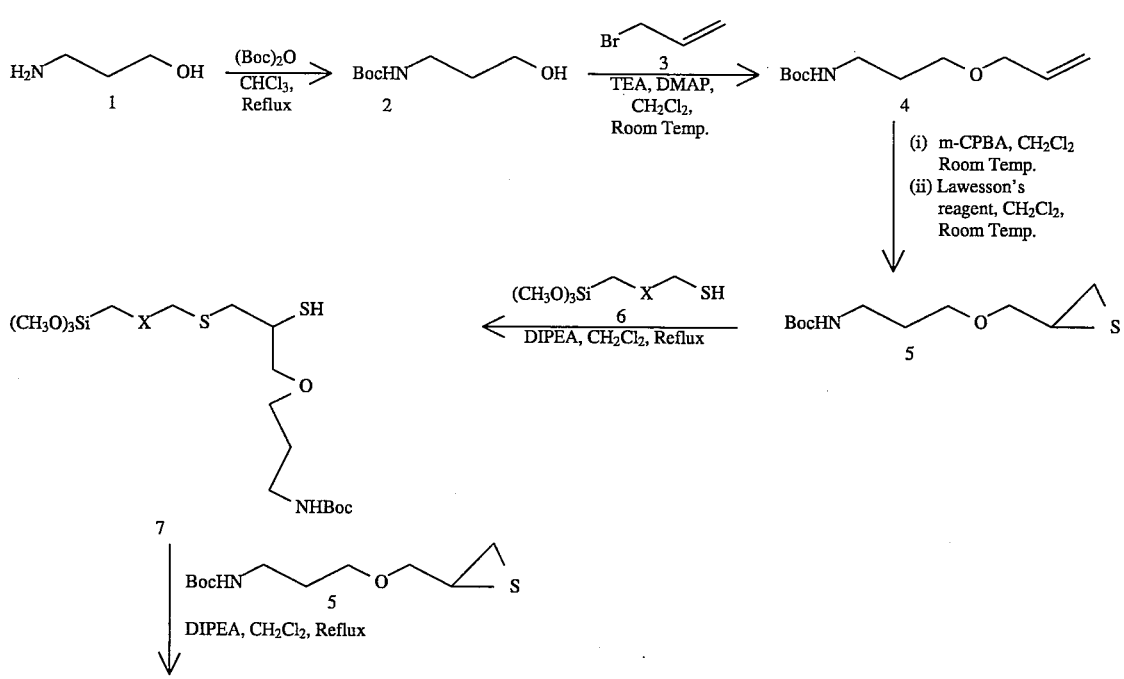

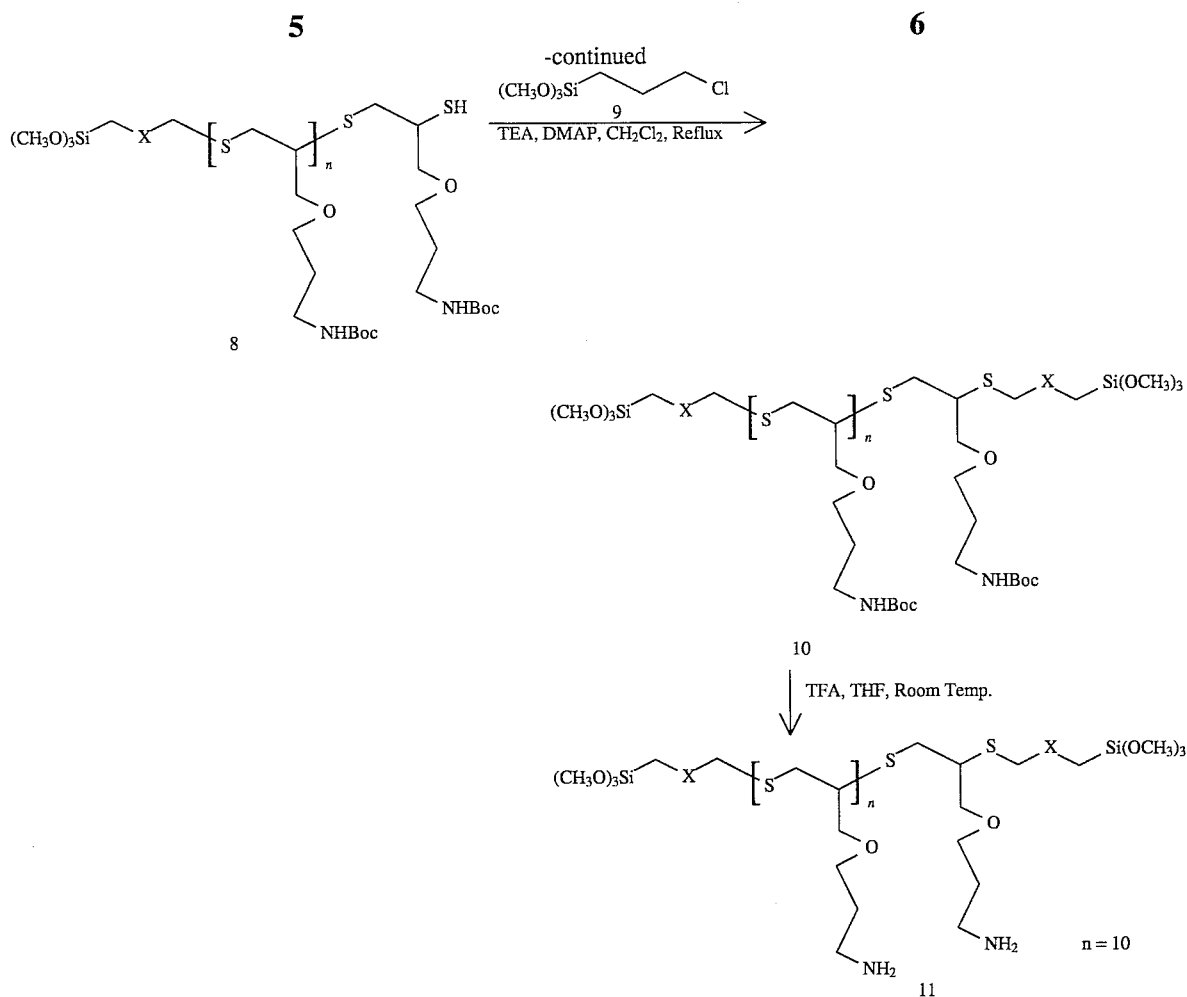

Note:
All reactions will be carried out under anhydrous conditions.

Names of the Numbered and Abbreviated Chemicals and the Reactants Shown:
1=3-Amino-1-propanol
2=3-(N-tert-Butoxycarbonyl)amino-1-propanol
3=Allyl bromide or 3-Bromopropene
4=Allyl 3-(N-tert-butoxycarbonyl)amino-1-propyl ether
5=[3'-(N-tert-Butoxycarbonyl)aminopropyl] (2,3-episulfin)propyl ether
6=(3-Mercaptopropyl)trimethoxysilane
9=(3-Chloropropyl)trimethoxysilane (Boc)$_2$O=Di-tert-butyl dicarbonate or Di-tert-butyl pyrocarbonate
Boc=tertButoxycarbonyl
m-CPBA=meta-Chloroperbenzoic acid Lawesson's reagent=2,4-bis(4-methoxyphenyl)-1,3-dithia-2,4-diphosphetane-2,4-disulfide TFA=Trifluoracetic acid TEA=Triethylamine DMAP=4-Dimethylaminopyridine DIPEA=Diisopropylethylamine CHCl$_3$=Chloroform CH$_2$Cl$_2$=Dichloromethane THF=Tetrahydrofuran The present expoxypolythioether precursors B may be prepared according to the following reactions:

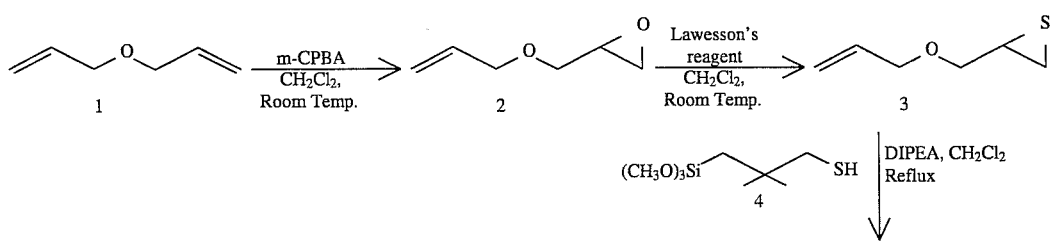

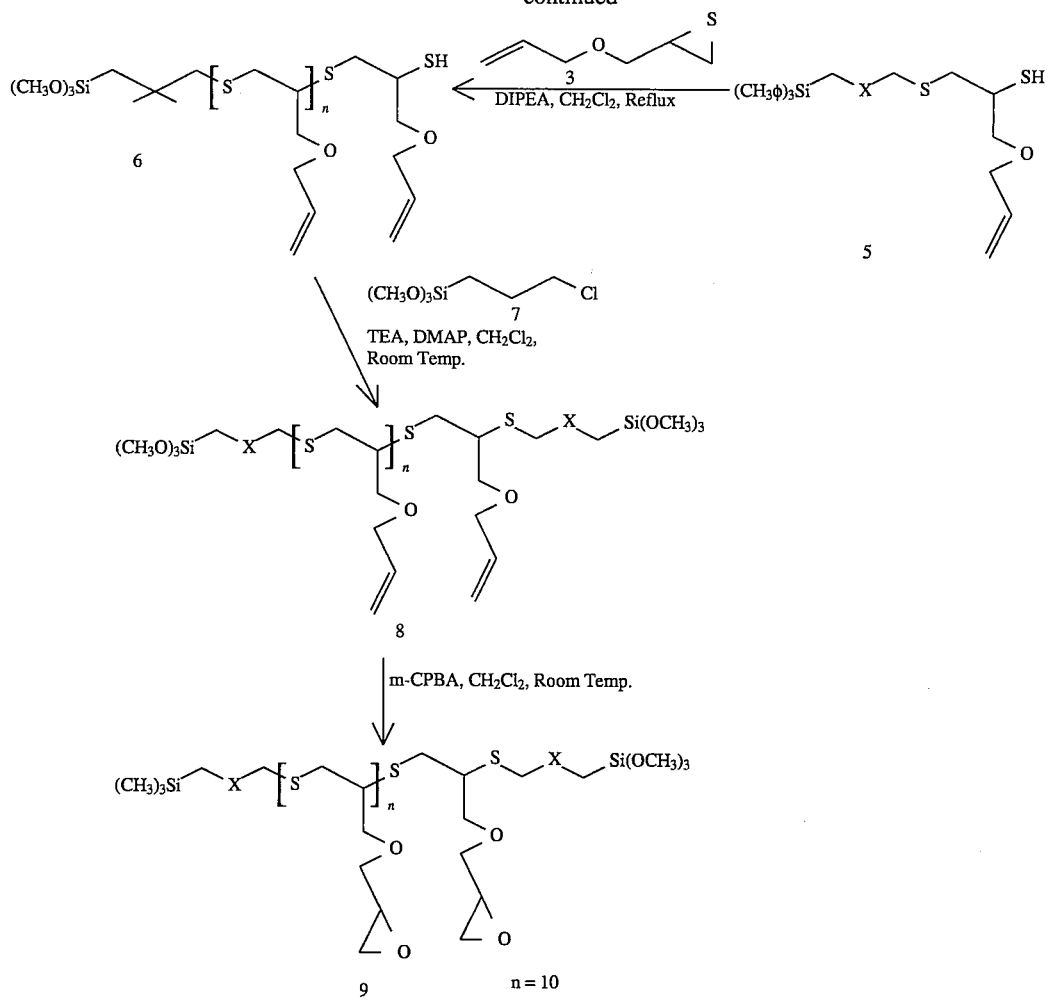

Names of the Numbered and Abbreviated Chemicals and the Reactants Shown:
1=Diallyl ether
2=Allyl (2,3-epoxy)propyl ether
3=Allyl (2,3-episulfiny)propyl ether
4=(3-Mercaptopropyl)trimethoxysilane
7=(3-Chloropropyl)trimethoxysilane
m-CPBA=meta-Chloroperbenzoic acid
Lawesson's reagent=2,4-bis(4-methoxyphenyl)-1,3-dithia-2,4-diphosphetane-2,4-disulfide
TFA=Trifluoroacetic acid
TEA=Triethylamine
DMAP=4-Dimethylaminopyridine
DIPEA=Diisopropylethylamine
$CHCl_3$=Chloroform
$CH_2Cl^2$=Dichloromethane As will be apparent to those skilled in the art, the present amino polythioethers and epoxy polythioethers are co-reactive liquid precursors which react with each other rapidly at normal room temperatures to form a rubbery elastomeric polymer having terminal hydroxyl or silyl groups which is flexible and stable over a wide temperature range of −60° F. to 350° F. The known reaction between the amino side chains of reactant A and the epoxide side claims of reactant B produces a plurality of —$R^3$—N—$CH_2$—CH(OH)—$R^3$— cross-linkages resulting in the formation of the cured polythioether elastomers of the present invention having a plurality of terminal hydroxyl or silyl groups which increase the affinity and bonding power of the present elastomers for a variety of surfaces including aluminum surfaces. Each amino reactant A group is reactive with two epoxy reactant B groups, and the reactants A and B can be selected to have from 2 to 20 of the amino or epoxy cross-linking groups $R^1$ depending upon the desired degree of cross-linking and the desired final molecular weight of the elastomer.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:
1. A solvent free, fluid polythioether composition which is rapidly curable at room temperature to form an elastomer which is flexible and stable over a temperature range between about −60° F. and +360° F., comprising a mixture of co-reactive polythioether polymer precursors of the formula:

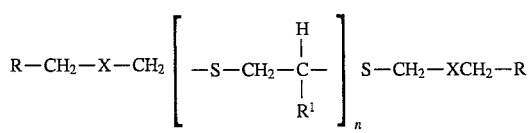

in which R is a radical from the group consisting of —OH, —OSi(OR$^2$)$_3$ and —Si(OR$^2$)$_3$; R$^2$ is a C$_1$–C$_4$ alkyl group; R$^1$ is —R$^3$—Z; R$^3$ is a phenylene, phenylene ether, alkylene or alkylene ether radical; n is a whole number between 2 and 20; Z is —(NH$_2$)$_y$ or

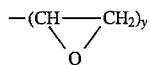

and y is 1 to 3 and X is —O— or —CH$_2$— said composition containing an amino precursor in which Z is —(NH$_2$)$_y$ and an epoxide precursor in which Z is

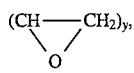

said amino and epoxide precursors being reactive to form said elastomer.

2. A composition according to claim 1 in which said amino precursor of the mixture comprises an amino-silyl polythioether having the formula:

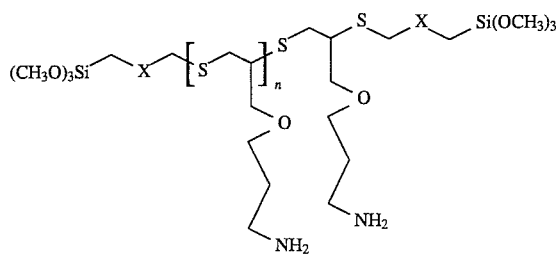

in which X and n have the meanings given in claim 1.

3. A composition according to claim 1 in which said epoxide precursor of the mixture comprises an epoxy-silyl polythioether having the formula:

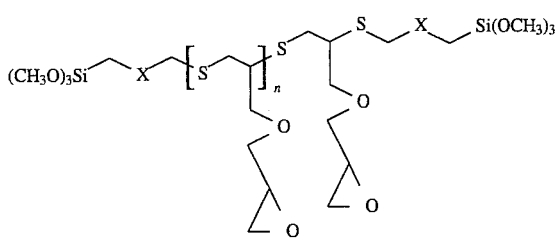

in which x and n have the meanings given in claim 1.

4. A composition according to claim 1 in which said mixture comprises said co-reactive precursors in a relative molar ratio between about 1:3 and 3:1.

5. A composition according to claim 1 in which said mixture comprises about equimolar amounts of said co-reactive precursors.

6. A low viscosity coating composition according to claim 1 having a viscosity of between about 1000 and 5000 centipoise.

7. A high viscosity caulk composition according to claim 1 having a viscosity of between about 10,000 and 20,000 centipoise.

* * * * *